United States Patent [19]
Kroeger et al.

[11] Patent Number: 5,684,835
[45] Date of Patent: Nov. 4, 1997

[54] LOCALLY COHERENT QPSK DETECTION WITH DIFFERENTIAL DECODING FOR A FADING CHANNEL

[75] Inventors: Brian W. Kroeger, Sykesville; Joseph B. Bronder, Elkridge; Jeffrey S. Baird, Baltimore, all of Md.

[73] Assignee: Westinghouse Electric Corporation, Pittsburgh, Pa.

[21] Appl. No.: 322,846

[22] Filed: Oct. 13, 1994

[51] Int. Cl.$^6$ .............................. H03D 3/22; H04L 27/22
[52] U.S. Cl. .......................... 375/325; 375/332; 375/340; 329/304
[58] Field of Search .................................. 375/332, 329, 375/324, 325, 330, 331, 261, 281, 280, 283; 329/304

[56] References Cited

U.S. PATENT DOCUMENTS

| | | | |
|---|---|---|---|
| 4,143,322 | 3/1979 | Shimamura | 325/320 |
| 4,318,049 | 3/1982 | Mogenson | 329/50 |
| 4,466,108 | 8/1984 | Rhodes | 375/83 |
| 4,787,096 | 11/1988 | Wong | 375/120 |
| 4,794,341 | 12/1988 | Barton et al. | 375/269 |
| 4,879,728 | 11/1989 | Tarallo | 375/80 |

OTHER PUBLICATIONS

Simon, et al., "Multiple Symbol Partially Coherent Detection of MPSK," IEEE Transaction on Communications, vol. 42, No. 2/4, New York, USA, pp. 430–439.

Luise, et al., "Carrier Frequency Recovery In All-Digital Modems For Burst-Transmission," IEEE Transactions on Communications, vol. 43, No. 2/4, New York, USA, pp. 1169–1178.

Connelly, "Design of the Westinghouse Series 1000 Mobile Phone," IEEE, pp. 347–350, May 18, 1993.

Connelly, "The Westinghouse Series 1000 Mobile Phone: Technology and Applications," IEEE, pp. 375–379, May 18, 1993.

*Primary Examiner*—Stephen Chin
*Assistant Examiner*—Hai H. Phan

[57] ABSTRACT

A locally coherent Quadrature Phase Shift Keying (QPSK) detector that uses a normalized fourth power weighting technique to generate an ambiguous local phase reference of a current symbol. A phase adjusted previous symbol reference is used to resolve the ambiguity using differentially coded data and yield current soft symbol information.

18 Claims, 11 Drawing Sheets

| ENCODER INPUT PAIR | PHASE OF PREVIOUS OUTPUT | PHASE OF CURRRENT OUTPUT | PHASE DIFFERENCE |
|---|---|---|---|
| 1,1 | +45 | -135 | 180 |
| 1,1 | -45 | +135 | 180 |
| 1,1 | +135 | -45 | 180 |
| 1,1 | -135 | +45 | 180 |
| 1,0 | +45 | -45 | -90 |
| 1,0 | -45 | -135 | -90 |
| 1,0 | +135 | +45 | -90 |
| 1,0 | -135 | +135 | -90 |
| 0,1 | +45 | +135 | +90 |
| 0,1 | -45 | +45 | +90 |
| 0,1 | +135 | -135 | +90 |
| 0,1 | -135 | -45 | +90 |
| 0,0 | +45 | +45 | 0 |
| 0,0 | -45 | -45 | 0 |
| 0,0 | +135 | +135 | 0 |
| 0,0 | -135 | -135 | 0 |
| ⋮ | ⋮ | ⋮ | ⋮ |

FIG. 10

+ IDEAL COHERENT DETECTION WITH DIFFERENTIAL CODING
⊷ IDEAL DIFFERENTIAL DETECTION
□ MODEM DIFFERENTIAL DETECTION, SIMULATION RESULTS
◇ MODEM LOCALLY COHERENT DETECTION, SIMULATION RESULTS

LOCALLY COHERENT QPSK DETECTION WITH DIFFERENTIAL DECODING FOR A FADING CHANNEL

BACKGROUND OF THE INVENTION

The present invention relates to a mobile terminal for a communication system, and more particularly to a method and apparatus for digital receiving in a communication system.

While the invention is subject to a wide range of applications, it is especially suited for use with a satellite communication system, and will be particularly described in that connection.

DESCRIPTION OF RELATED ART

In a typical satellite communication system, outgoing RF signals transmitted from a mobile terminal unit are received directly by the satellite. The satellite in turn retransmits the RF signals to a ground station that is connected by wire to a public switched telephone network (PSTN), which in turn routes the outgoing signals to either a conventional telephone or to another mobile terminal unit of a satellite or cellular network. Incoming signals from a conventional wired telephone are conducted from the PSTN to the satellite ground station, which in turn transmits RF signals to the satellite for retransmission to the mobile terminal unit. Thus, communication can be between two mobile terminal units or between a mobile terminal unit and a conventional telephone connected to a PSTN, or between a satellite mobile terminal unit and a cellular mobile terminal unit, for example. In each of the aforesaid conditions (except mobile terminal to mobile terminal), the communication is routed through a PSTN.

It has been proposed, to provide a satellite communications network that utilizes geosynchronous satellites each of which is capable of covering an area corresponding to a substantial portion of the North American continent, so that one satellite with approximately six beams will cover the entire continent from Alaska to Mexico. The satellites for such a network will be approximately 22,600 miles above the equator and will be designed to operate in the L-band of RF frequencies. For example, the frequency of the signal being transmitted to the satellite will be between 1626 MHz to 1660 MHz, and the frequency of the signal received from the satellite will be between 1525 MHz to 1559 MHz. Energy travelling this great distance undergoes huge attenuation such that the power flux density incident at the antenna of the mobile unit is approximately $10^{-14}$ watts per square meter. This grossly attenuated signal is further degraded by noise, and other satellite channel impairments such as Rician fading due to multipath-fading.

Mobile terminal units capable of receiving signals of this order of magnitude are either limited to paging signals or require extremely sophisticated hardware, which is bulky and heavy and does not lend itself to mobility. Also, the limited functions and expense of such terminal equipment would prevent its acceptance among a large segment of potential users.

In light of the foregoing, there is a need for a mobile terminal unit that is not only capable of reliably receiving the attenuated signals, subject to Rician fading, of a high altitude satellite for voice, facsimile, and data communication, but also compact, lightweight, and relatively inexpensive to manufacture.

SUMMARY OF THE INVENTION

The present invention is directed to a receiving method and apparatus that overcomes the problems and disadvantages of the prior art.

In accordance with the purpose of the invention, as embodied and broadly described herein, the invention is a receiver for a digital communication system that has an RF section and a digital signal processor section. The digital signal processor section includes apparatus for detecting the information encoded by received symbols in a Quadrature Phase Shift Keyed (QPSK) signal that includes means for receiving the QPSK signal, which is formed of successive symbols; means for determining a fourth power of a sample of the received symbols, the sample of the received symbols including a previous symbol and a current symbol and a plurality of surrounding symbols; means, connected to the fourth power determining means, for determining a weighted average of the output of the fourth power determining means; means, connected to the weighted average determining means, for finding an ambiguous local phase reference for the current symbol; means, connected to the ambiguous local phase reference finding means, for determining a phase adjustment of the previous symbol; means, connected to the ambiguous local phase reference finding means, for resolving a phase of the ambiguous local phase reference in accordance with the determined phase adjustment of the previous symbol; and means connected to the resolving means, for outputting a soft decision output for the current symbol in accordance with the resolved local phase reference.

In another aspect, the present invention is a method of detecting information received by a mobile receiver in a digital communication system comprising receiving successive symbols corresponding to Quadrature Phase Shift Keyed (QPSK) signals; sampling the received symbols including a previous symbol, a current symbol, and a plurality of surrounding symbols; determining a fourth power of the received symbols; determining a weighted average of the fourth power of the samples; finding an ambiguous local phase reference for the current symbol; adjusting the phase of the previous symbol in accordance with the ambiguous local phase reference; resolving the phase of the ambiguous local phase reference in accordance with the phase adjustment of the previous symbol; and outputting a resolved soft decision for the current symbol in accordance with the ambiguous local phase reference.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENT

Reference will now be made in detail to the preferred embodiment of the invention, examples of which are illustrated in the accompanying drawings. Wherever possible, the same reference numbers will be used throughout the drawings to refer to the same or like parts.

Figure 1:
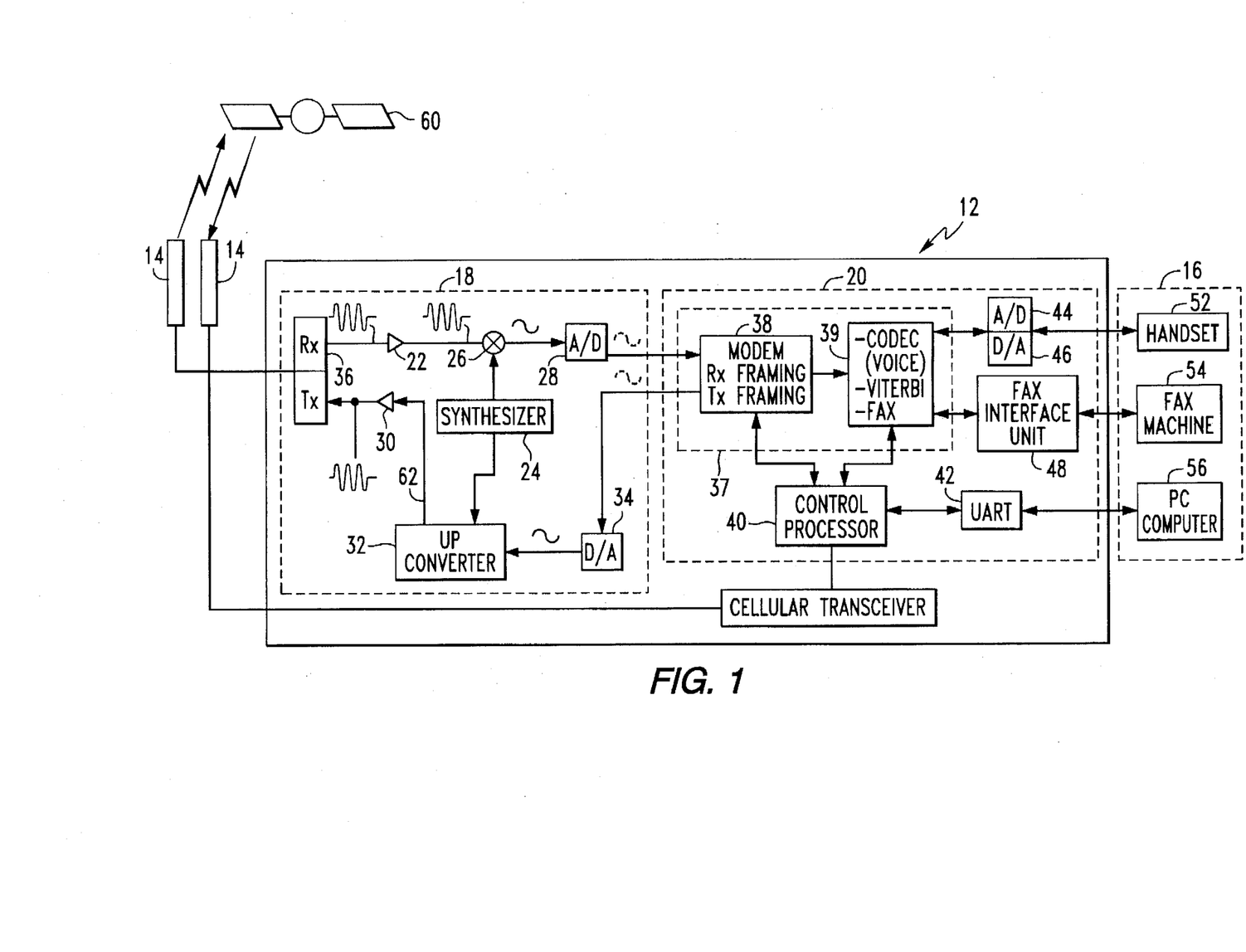
FIG. 1 is a schematic block diagram of a mobile terminal apparatus of the present invention.

FIG. 1 shows a mobile terminal unit comprising a transceiver 12, an antenna 14, and one or more user interfaces 16. The transceiver 12 has an RF section 18 and a processor board 20.

The RF section has a receiving portion that includes a low noise amplifier 22, a down converter 26, and an analog to digital converter (A/D) 28. The RF section also has a transmitter portion that includes a high power amplifier (HPA) 30, an upconverter 32, signal line 62, and digital-to-analog converter (D/A) 34. The antenna 14 is connected to the RF section through a diplexer 36.

The processor board has a digital signal processor 37 including a modem processor 38 and a coder/decoder and fax processor 39, a control processor 40, a universal asynchronous receiver/transmitter (UART) 42, an A/D converter 44, a D/A converter 46, and a fax interface unit 48. The user interfaces of the terminal unit include an output 52 for a handset, an output 54 for a facsimile machine and an output 56 for connection to a personal computer. The apparatus may also include a cellular transceiver board (not shown).

The transmit signal begins in the processor board 20 as digital data, which is then converted into digitized, modulated waveform samples. This digitized waveform, which is created by the processor 37, is conducted to the digital-to-analog (D/A) converter 34 before the upconverter 32 of the RF section. The converter 34 converts the digitized waveform into both an analog I (in phase) and Q (quadrature) waveform. The analog I and Q waveforms are then sent to the mixer or upconverter modulator 32 where they are upconverted to an L-Band, and then summed to form a low level L-Band transmit signal on line 62. This low level L-Band transmit signal is amplified by the high power amplifier 30. The resulting high level L-Band transmit signal then passes through transmit side of the diplexer 36 and is steered towards the mobile satellite terminal (MT) antenna 14 from which it travels to the satellite 60.

In operation, the DSP 37 reads the received signal waveform samples from the A/D converter 28, and processes these samples as they arrive. The L-Band receive signal is mixed down to the low IF frequency to aid in signal filtering and to reduce the A/D sample rate so that the digital signal processing can keep up with the sample arrival. Once the receive signal has been sampled and loaded into the DSP 37, all subsequent signal processing is performed by the DSP as controlled by the control processor 40. Received signals are demodulated, in other words translated, from their waveform representation into their digital data representation, decoded and packaged for voice, fax or data processing at the DSP 37 at the user interface 16.

The processor board comprises a signal processor including a digitally implemented demodulator function, a digitally implemented modulator function, a digitally implemented receive framing function coupled to the demodulator, a digitally implemented transmit framing function coupled to the modulator function, and a digitally implemented encoding function and decoding function coupled to the transmit and receive function, respectively.

Figure 2:
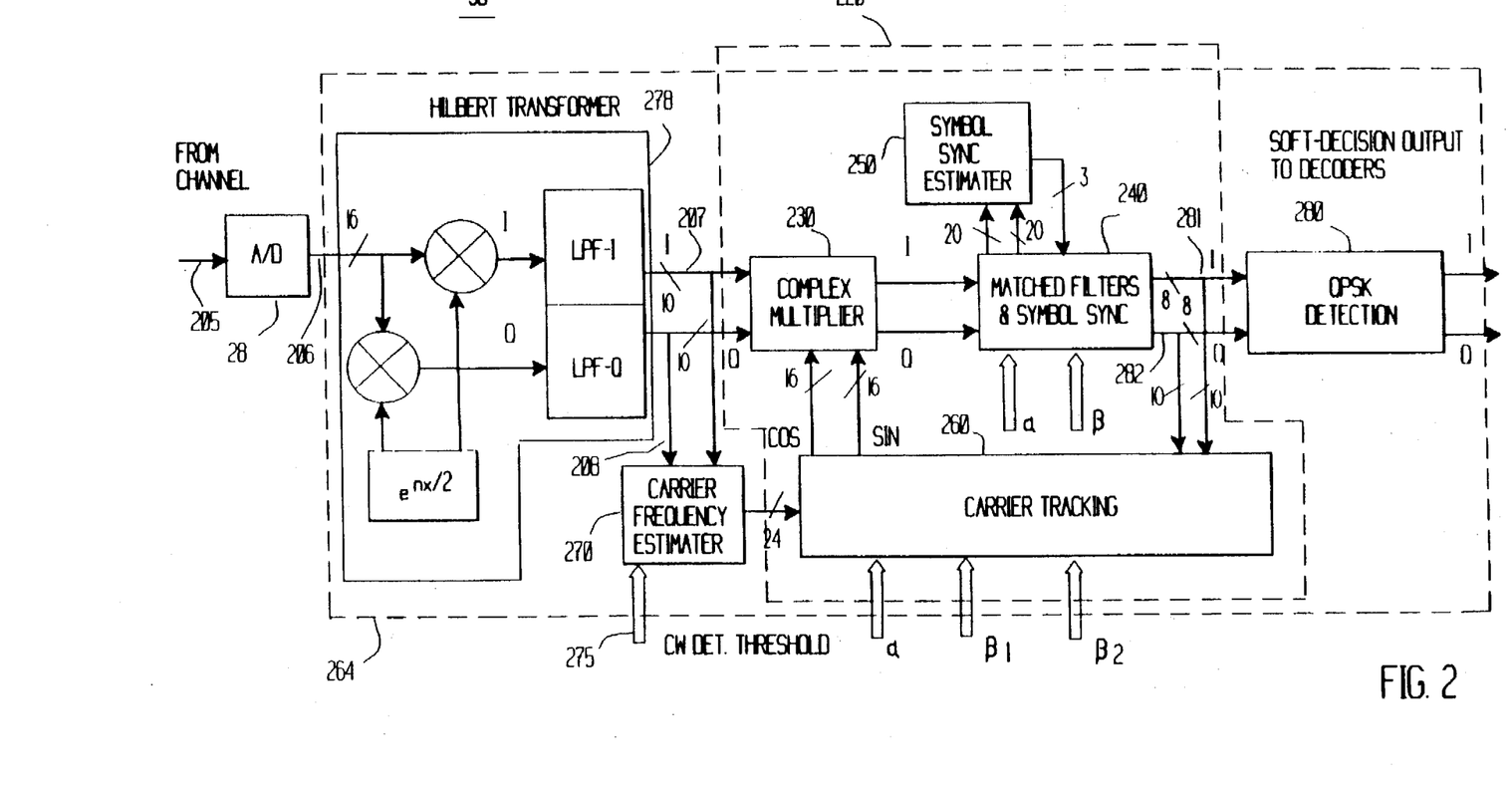
FIG. 2 is a schematic block diagram of a demodulator of the apparatus of FIG. 1.

FIG. 2 is a schematic block diagram of a demodulator 264 of the system of FIG. 1. In FIG. 2, an analog signal 205 is received and converted to a digital signal 206 by the analog-to-digital (A/D) converter 28. Signal 206 is input to Hilbert Transformer 278, which yields a digital 10-bit in-phase signal (I) 207 and a digital 10-bit quadrature signal (Q) 208. Signals (I) 207 and (Q) 208 are input to carrier tracking loop 220, which includes a complex multiplier 230, matched filters and symbol synchronizer 240, a symbol synchronizer estimator 250, a carrier tracking element 260, and a carrier frequency estimator 270. The output from the carrier tracking loop is input to a QPSK detector 280.

As the QPSK signal is received, several types of synchronization must be performed on the signal. First, the system must determine the frequency of the "carrier wave" that is being phase modulated. Second, the system must determine where each bit of information begins, i.e., "bit synchronization." Third, the system must determine where each symbol (represented by multiple bits) begins, i.e., "symbol synchronization."

A QPSK system may use "differential detection" to determine bit synchronization. However, such systems without the benefit of the present invention experience difficulty when the received signal is noisy or experiences fading. The present invention provides a QPSK detector that can estimate a degree of certainty for received symbol values.

The elements of demodulator 264 preferably are embodied in instructions performed by processor 38 of FIG. 1, which executes a software program stored in a memory, such as a ROM (not shown). Processor 38 preferably is a DSP 320C51 fixed point processor manufactured by Texas Instruments Corporation. However, any processor capable of performing the process described could be used to implement the invention.

Certain elements of the demodulator 264, such as oscillator and component 240, may be implemented in hardware. A person of ordinary skill in the art understands that FIGS. 2–10 can represent either a hardware or a software implementation of the present invention, and that the invention is not limited to either a hardware or a software implementation.

In accordance with the present invention, the QPSK detector uses a technique for locally coherent detection (demodulation) of a digital QPSK modulated signal that performs especially well in a "fading environment." The parameters of the technique can be optimized to suit the particular fading characteristics and statistics in order to optimize performance in a particular known fading environment. The locally coherent QPSK detector 280 of the present invention produces a multi-bit "soft-decision" output that is then input to a forward error correction (FEC) element (not shown).

Figure 10:
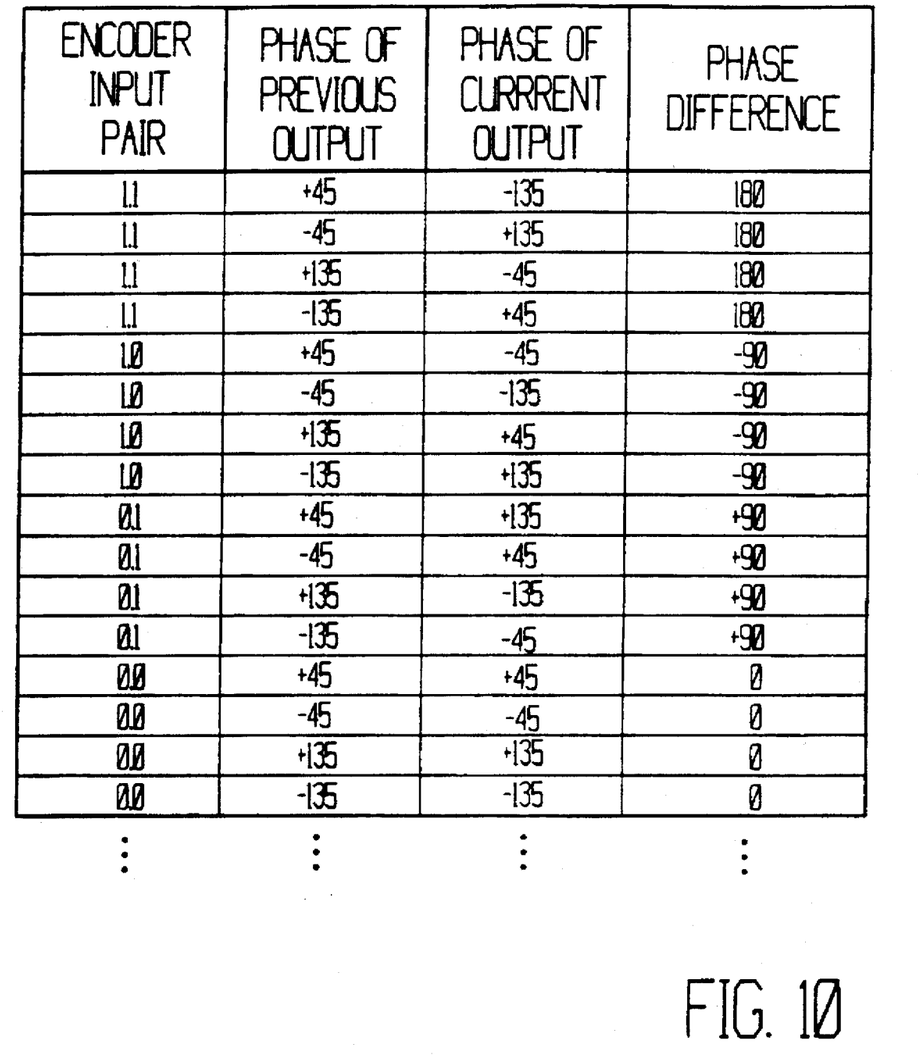
FIG. 10 is a chart explaining a LCQPSK encoding scheme.

FIG. 10 is a chart showing an encoding scheme for a locally coherent QSPK system. FIG. 10 shows how bit pairs are encoded. The encoder output is a complex number whose phase is 45 degrees plus an integer multiple of 90 degrees. The encoder input determines the difference between the phases of two consecutive encoder outputs. Thus, if, for example, the encoder input is 1,1, then the difference between the phase of the current encoder output and the previous encoder output is always 180 degrees independent of the actual value of the previous output. Similarly, the phase difference between current and previous encoder outputs is 90 degrees when the encoder input is 0,1. So the phase differences of the encoder outputs contain the information necessary to recover the bit pairs that make up the encoder inputs.

Figure 3A:
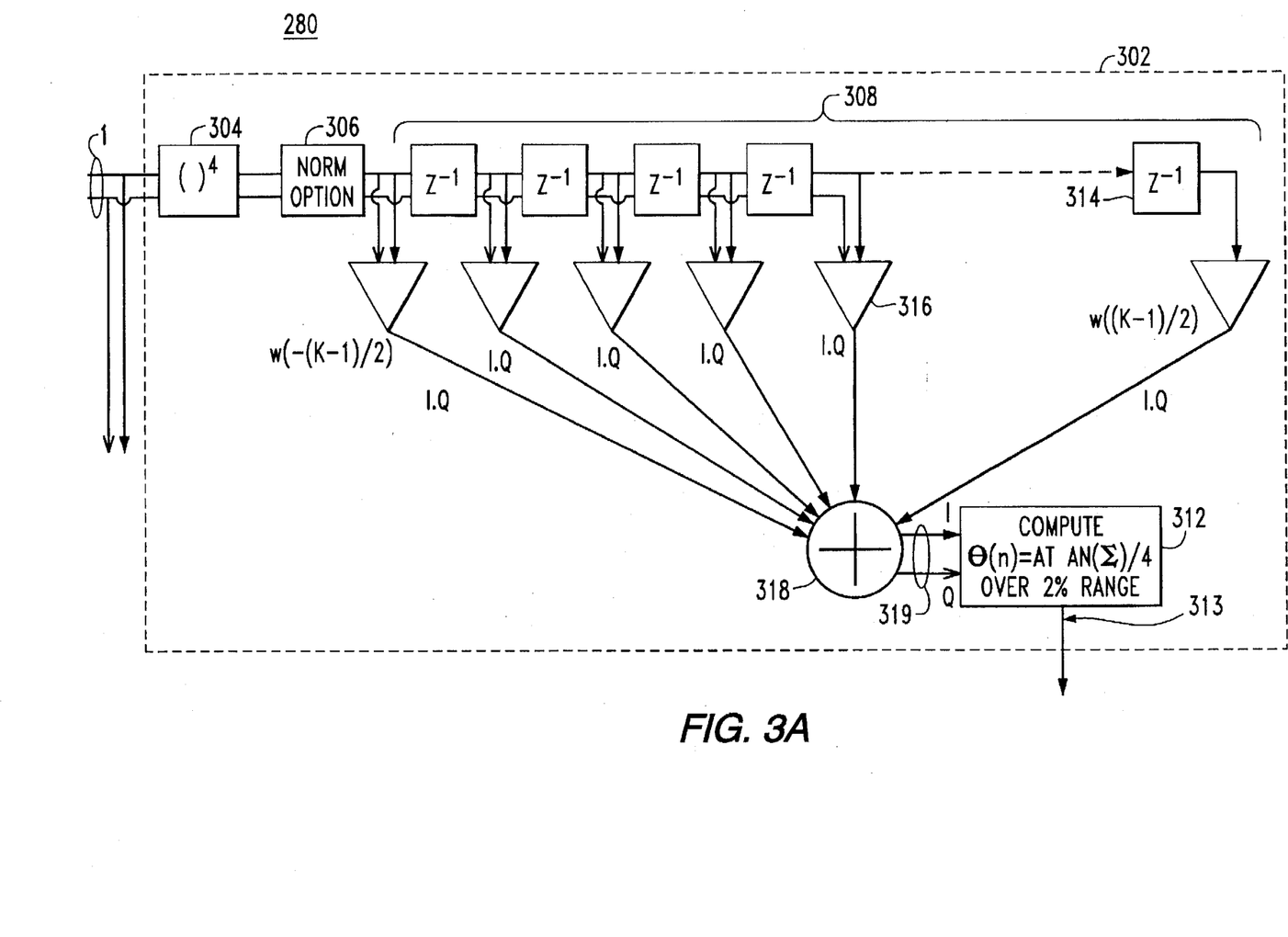
FIGS. 3A and 3B are schematic block diagrams of a QPSK detector element of FIG. 2.
Figure 3B:
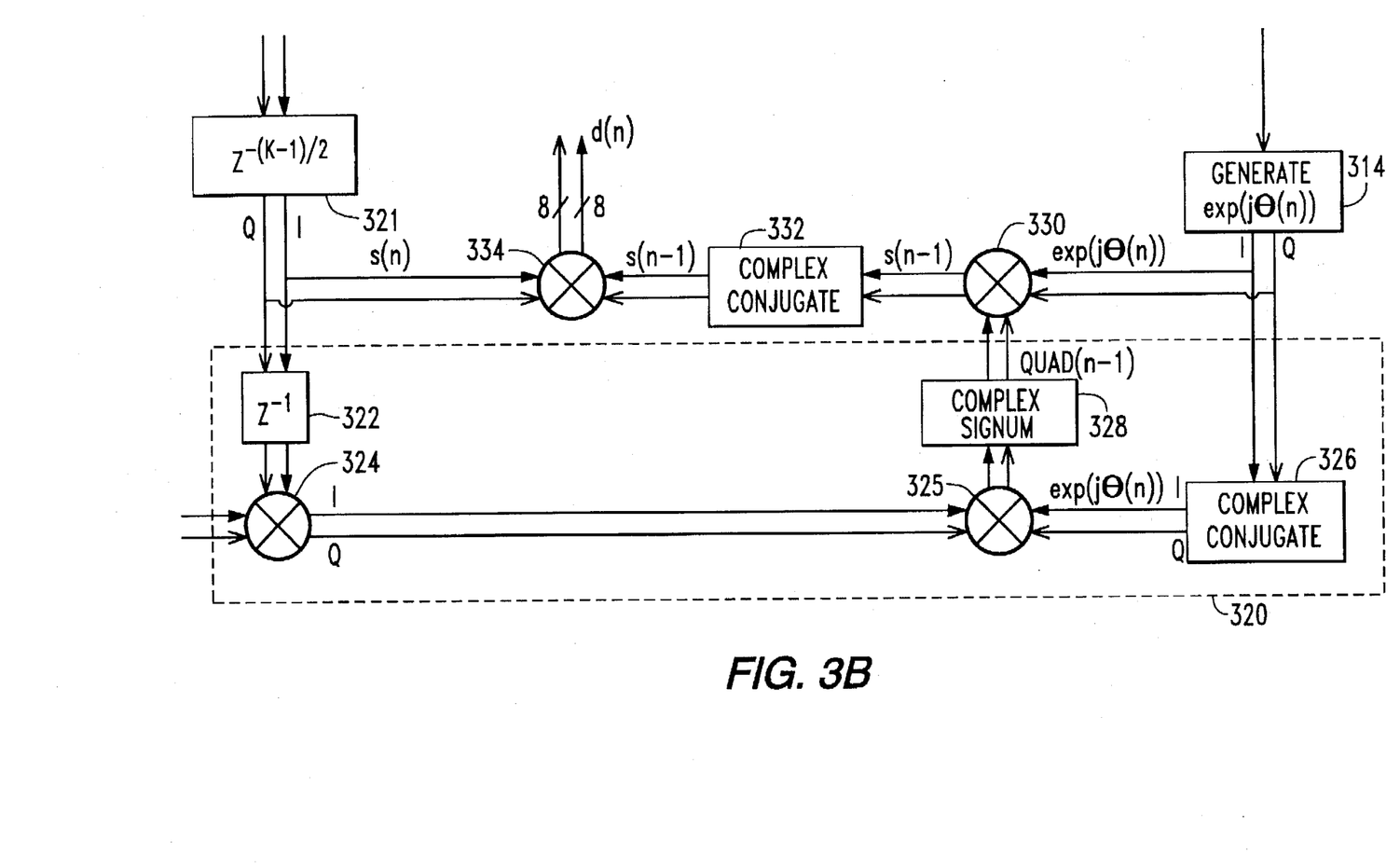

FIG. 3A and 3B are schematic block diagrams of the QPSK detector 280 of FIG. 2. The carrier tracking loop 220 of FIG. 2 virtually eliminates frequency error (any residual frequency error can be represented as a phase error, which is a function of time). Because, however, the carrier tracking loop 220 of FIG. 2 does not establish a reference phase for the QPSK detector 280, a near baseband signal 301 at the input of the QPSK detector 280 has an arbitrary phase offset, which must be resolved by the QPSK detector 280. In a fading environment, the phase offset is random and it is necessary to estimate the value of the phase reference.

Locally coherent QPSK detector 280 samples the matched filter synchronously at optimal symbol times. In the described embodiment, the symbol rate is 3375 samples per second. Each symbol (I,Q) pair represents two bits of information.

The role of the matched filter 240 in the receiver is to recover the encoder outputs. Ideally, the demodulator input 301 is a representation of the output of the differential encoder of a transmitter. But various components of the transmitter/medium/receiver chain modify both the amplitude and phase of these outputs so the demodulator input bears little resemblance to the ideal. As long as the unknown phase shift is constant between consecutive bits, the encoder inputs can be recovered by calculating the phase difference between consecutive pairs of the demodulator inputs.

The input signal to the locally coherent QPSK detector is a sequence of the synchronized symbol samples from the matched filter 240. Each symbol is characterized by:

$$S_n = a_n \cdot e^{j(d_n \pi/4) + \phi_n} + n_n \quad (1)$$

where the amplitude $a_n$ and arbitrary phase $\phi_n$ are samples of random processes (dependent on the fading) that have bandwidths less than the symbol rate, $d_n=0,1,2$ or 3 depending on the two bits of information represented by the nth symbol, and $n_n$ is a sample of a complex noise process (e.g., additive white gaussian noise (AWGN)). The output of the locally coherent QPSK detector is a sequence of soft-decision bit pairs representing the information carried by each QPSK symbol. The goal of the QPSK detector is to accurately determine the two bits of information in each symbol $s_n$ represented by $d_n$ in the presence of noise or other channel impairments.

Although FIGS. 3A and 3B show functional blocks, it should be understood that all functions of QPSK detector 280 preferably are performed by processor 38 of FIG. 1, which executes instructions stored in a memory (not shown). Another embodiment of QPSK detector 280 may implement the functional blocks of FIGS. 3A and 3B in hardware.

The modem is subject to additive noise and fading. As a result, the phase differences between consecutive demodulator inputs will no longer be multiples of 90 degrees. The invention avoids the phase errors attributable to additive noise that affect the differential decoding process. It does this by deriving a complex quantity which, in effect, is a reconstruction of the encoder output for the prior symbol rotated by the slow varying phase shift introduced in the transmitter/medium/receiver chain but without the rapidly varying phase shifts caused by additive noise.

The phase of the n-th demodulator input 301 will be the sum of three components:

$$\Gamma_n + \Theta + \phi_n$$

where $\Gamma_n$ is the term introduced by the encoder (45 degrees plus an integer multiple of 90 degrees), $\Theta$ is a slow varying unknown phase shift, and $\phi_n$ is a rapidly unknown phase shift. Fading causes the variations in the slowly varying phase component while additive noise is the source of the rapidly varying phase component. The term $\Gamma_n$ is of the form:

$$\Gamma_n = \pi/4 + k_n \pi/2$$

where $k_n$ is an integer that depends on the encoder input and the phase of the previous encoder output as explained earlier. The differential decoder needs the difference $$\Gamma_n - \Gamma_{n-1} = (k_n - k_{n-1})\pi/2$$

for error free demodulation. Conventional differential detection gives:

$$\Gamma_n - \Gamma_{n-1} + \phi_n - \phi_{n-1} = (k_n - k_{n-1})\pi/2 + \phi_n - \phi_{n-1}$$

which contains two error terms. The objective of the invention is to produce:

$$\Gamma_n - \Gamma_{n-1} + \phi_n = (k_n - k_{n-1})\pi/2 + \phi_n$$

with a single error term. To arrive at this result, the invention derives a complex local phase reference whose phase is $$\Gamma_{n-1} + \phi_n$$

i.e., a complex quantity whose phase is the sum of the information content of the previous symbol and the slowly varying unknown phase.

As shown in FIGS. 3A and 3B, local phase reference element 302 includes a fourth power element 304, a normalizer 306, a weighted averager 308 and an arctangent element 312. The symbol samples $S_{n+k}$ are complex samples out of the matched filter 240 of FIG. 2 where the sample timing is synchronized to optimum symbol sampling point. This optimization can be accomplished through any of a variety of conventional matched filter and symbol synchronization techniques. The fourth power element 304 removes the modulation whose phase constellation is spaced at $\pi/2$. Since the fourth power multiplies the exponent by four, then $4 \cdot \pi/2$ is $2\pi$, which is the same as a phase shift of zero. Thus, element 304 eliminates modulation in the signal. The normalizer 306 is discussed below in connection with weighted averager 308.

Weighted averager 308 computes a weighted average of the fourth power of each sample of a group of symbols centered around the symbol to be detected. The weighted averager 308 includes a plurality of delay elements 314, a plurality of weighted filters 316, and an adder 318. There are preferably k delay elements 314, where k=17. Other values of k may also be used without departing from the spirit and scope of the invention. Each delay element 314 provides a delay of one symbol time period. Thus, in the delay elements 314, the center delay element is surrounded by (k−1)/2 delay elements on either side. Each delay element 314 has a corresponding weight elements 316 coupled thereto. The outputs of weight elements 316 are input to the adder 318. In the described embodiment, the weight elements 316 use weights that are derived from the autocorrelation of a 10% root cosine Nyquist fading filter with a 100 Hz bandwidth, for example, representing the spectrum of the fading process.

Figure 4:
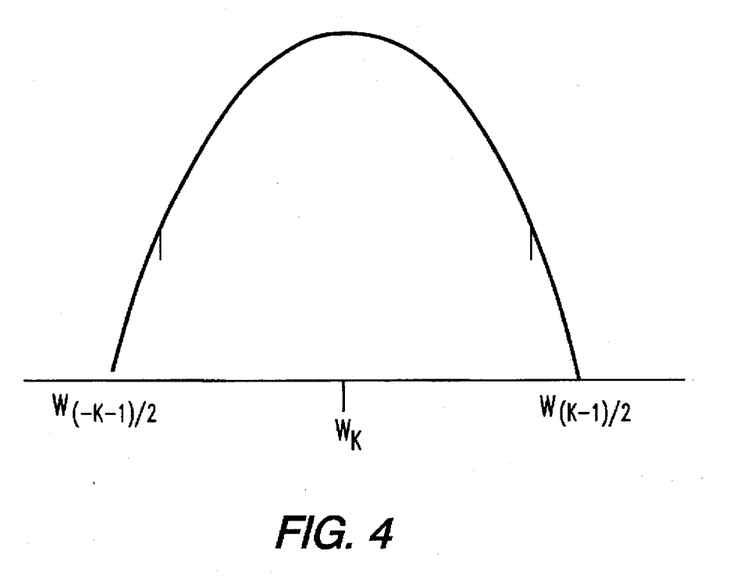
FIG. 4 is a graphical representation of a weighting function for weighting filters in the QPSK detector of FIGS. 3A and 3B.

FIG. 4 shows an approximation of these weights. As shown in FIG. 4, a current symbol has a highest weighting while the (k−1)/2 symbols on either side have lower weightings. It should be understood that other weightings may also be used in the invention that are appropriate to the fading environment in which the demodulator will operate.

The output 319 of the adder 318 is a complex number (an I,Q pair) whose angle is four times the weighted mean (a consequence of the fourth power computation). The output 319 from adder 318 of weighted averager 308 can be expressed as:

$$\overline{s_n^4} = \sum_{k=-(K-1)/2}^{(K-1)/2} w_k \cdot \frac{s_{n+k}^4}{|s_{n+k}|^\rho} \quad (2)$$

where K (odd) is the number of filter coefficients $W_k$, and $\rho$ is an adjustable value between zero (no amplitude normalization or computation required) and four $\rho$ (constant amplitude result). In the described embodiment, $\rho$ is set to two. In another embodiment, $\rho$ is set to zero to yield increasing suppression for small samples. Such a setting of $\rho$ may be beneficial for fading. In embodiments where $\rho$ is set to zero, no normalization occurs.

For clarity, the last expression can be described in simpler terms as $$\overline{s_n^4} = C_n \cdot e^{j \cdot 4\overline{\theta_n} + n'_n} \quad (3)$$

This expression shows that the desired term is a complex number whose angle is four times the weighted mean. The new weights $C_n$ are a function of the filter weights and the type of normalization used. The filtering operation 308 in the QPSK demodulator reduces the effects of the fast varying phase term. So, except for a much reduced residual phase term due to additive noise, the phase of the filter output will be dominated by two components, the 180 degree phase shift and a component that is equal to four times the slow varying phase:

$$\pi + 4\theta$$

The next step is to derive a reference from this average fourth power signal. Next, in the arctangent element 312, the processor 38 derives an ambiguous local phase reference 313 from the average fourth power signal output from the adder 318. The ambiguous local phase reference 313 is found by computing the unambiguous arctangent of the average fourth power sample, then dividing by four (because the fourth power quadruples the angle). The ambiguous local phase reference ($\theta_n$), is always in the first quadrant (alternatively, the range can be $\pm\pi/4$ if the domain is $\pm\pi$). The ambiguous local phase references 313 are related to the arctangent element 312 as follows:

$$\theta_n + k\pi/C = \frac{1}{4} \cdot \arctan\left(\frac{\Im[\overline{s_n^4}]}{\Re[\overline{s_n^4}]}\right) + k\pi/2, k = 0, 1, 2, 3 \quad (4)$$

The arctangent operation (part of 312) performed on the filter output produces an angle between −180 and +180 degrees. In an exponent element 314, processor 38 converts the unambiguous local phase reference 313 from element 312 to a complex number.

Processor 38 then resolves the ambiguity of the local phase reference by phase adjusting the previous symbol (s(n−1)) prior to the current symbol and by then using the phase adjusted symbol to resolve the ambiguity of the local phase reference. The phase adjustment of the previous symbol is accomplished by elements within dashed lines 320. The elements 320 include a delay element 322, a complex multiplier 324, a complex multiplier 325, a complex conjugate element 326, and a complex signum element 328. A delay element 321 outputs current symbol s(n), while the delay element 322 outputs a previous symbol s(n−1). Previous symbol s(n−1) is rotated 45 degrees by the complex multiplier 324.

The phase adjustment of the previous symbol is accomplished by computing the complex conjugate of the first quadrant phase reference in complex conjugate element 326, and by performing a complex multiply (element 325) on the output of the complex conjugate element 326 and the rotated previous symbol s(n−1) output from the complex multiplier 324. Complex signum element 328 determines the quadrant of that result. The process of elements 325 and 328 can be expressed as follows:

$$\text{quad}_{n-1} = \text{sign}[S_{I,n-1} \cdot (\cos(\theta_n) + \sin(\theta_n)) + S_{Q,n-1} \cdot (\sin(\theta_n) - \cos(\theta_n))] + j \cdot \text{sign}[S_{I,n-1} \cdot (\cos(\theta_n) - \sin(\theta_n)) + S_{Q,n-1} \cdot (\cos(\theta_n) + \sin(\theta_n))]$$

Equation 4 identifies which of the ambiguous phases should be used for the demodulation process. Equation 4 identifies which of the four ambiguous phases is closest to the phase of the previous symbol. It does this through a series of operations (exponentiations, conjugations, multiplications) which rotate the "principal" ambiguous phase (the one in the first quadrant) into the quadrant that contains the difference between the phase of the previous symbol and the principal ambiguous phase. In other words, the operations generate a complex quantity whose phase is the difference between the principal ambiguous phase and the phase of the previous symbol and rotates the result so that the difference is centered in one of the four quadrants. The variable "quad" can assume any one of 4 complex binary values (e.g., 11, 10, 01, 00, representing (1,j), (1,−j), (−1,j), and (−1,−j), respectively). The quadrant is established in equation (4) by first computing the "difference phaser" with a conjugate product of the previous symbol and the first quadrant phase reference by complex multiplier 325. The difference phaser has been rotated by 45 degrees (see element 324) such that the quadrant offset can be found by observation of the polarities of the two complex elements of quad. Next, processor 38 adjusts the first quadrant phase reference to the appropriate quadrant in element 330 in accordance with the following:

$$\hat{s}_{n-1} = e^{j\theta_n} \cdot \text{quad}_{n-1} \quad (6)$$

The processor 38 then determines a complex conjugate in element 332. The soft decision bits are determined by the processor 38 in the complex multiplier 334. The output of the complex multiplier 334 is a pair of 8-bit I,Q values in accordance with:

$$\hat{d}_n = s_n \cdot \hat{s}^*_{n-1} \quad (7)$$

These values indicate a degree of certainty of the inputs to the QPSK detector 280. Thus, high values indicate a high degree of certainty for positive values and low (<0) values indicate a high degree of certainty for negative values.

9

In a preferred embodiment, elements 312 and 314 are combined for efficiency of execution. The cosine and sine functions of the complex exponential 314 may be determined directly from series expansion of the embedded (¼)arctan function of the element 312 (instead of first computing the arctan, then the sine and cosine of the angle). This direct determination is performed as follows:

$$\cos\left(\frac{atan(x)}{4}\right) = 1 - \frac{1}{32} \cdot x^2 + \frac{43}{2048} \cdot x^4 - \frac{1061}{65536} \cdot x^6 + \ldots \quad (8)$$

$$\sin\left(\frac{atan(x)}{4}\right) = \frac{1}{4} \cdot x - \frac{11}{128} \cdot x_3 + \frac{431}{8192} \cdot x^5 - \frac{10003}{262144} \cdot x^7 + \ldots$$

Preferably, the series would be expanded to only two terms, although other embodiments may expand the series further.

For the direct determination, regions of convergence must be checked and adjusted with additional angle rotation where convergence is a problem. Furthermore, because the reference phase is correlated from sample to sample, the cosine and sine expansions may possibly be further simplified by simply adjusting the last values using a simpler function of the next argument.

Figure 5:
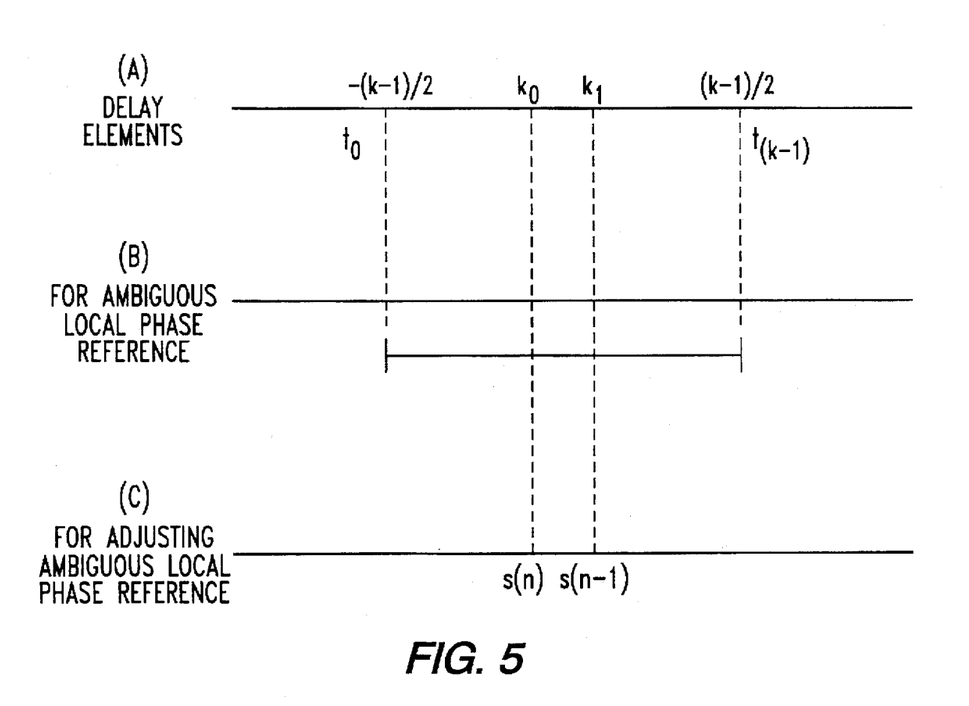
FIG. 5 is a timing chart for symbols in the QPSK detector of FIGS. 3A and 3B.

FIG. 5 is a timing diagram showing a relationship between the values in the k delay elements 314 (part (a)), which are the values used to determine the ambiguous local phase reference 313. The values in delay elements 314 shown in part (b) are averaged to yield the ambiguous local phase reference. As shown in FIG. 5, the value in delay element k is a center element and corresponds to symbol s(n). The value in delay element k+1 corresponds to previous symbol s(n−1).

Figure 6:
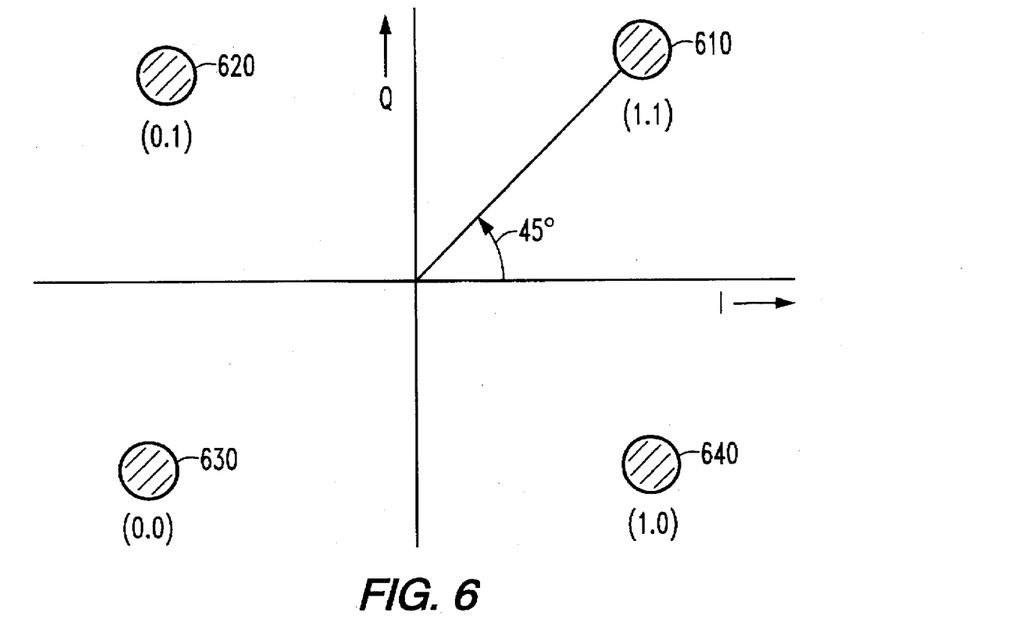
FIG. 6 is a diagram of ideal inputs to the QPSK detector of FIGS. 3A and 3B.

FIG. 6 is a diagram of ideal inputs into the QPSK detector 280. FIG. 6 shows a horizontal I axis and a vertical Q axis. Regions 610, 620, 630, and 640 surround the ideal values for the various four possible symbol values. Values 610 have, e.g., an angle of 45°.

Figure 7:
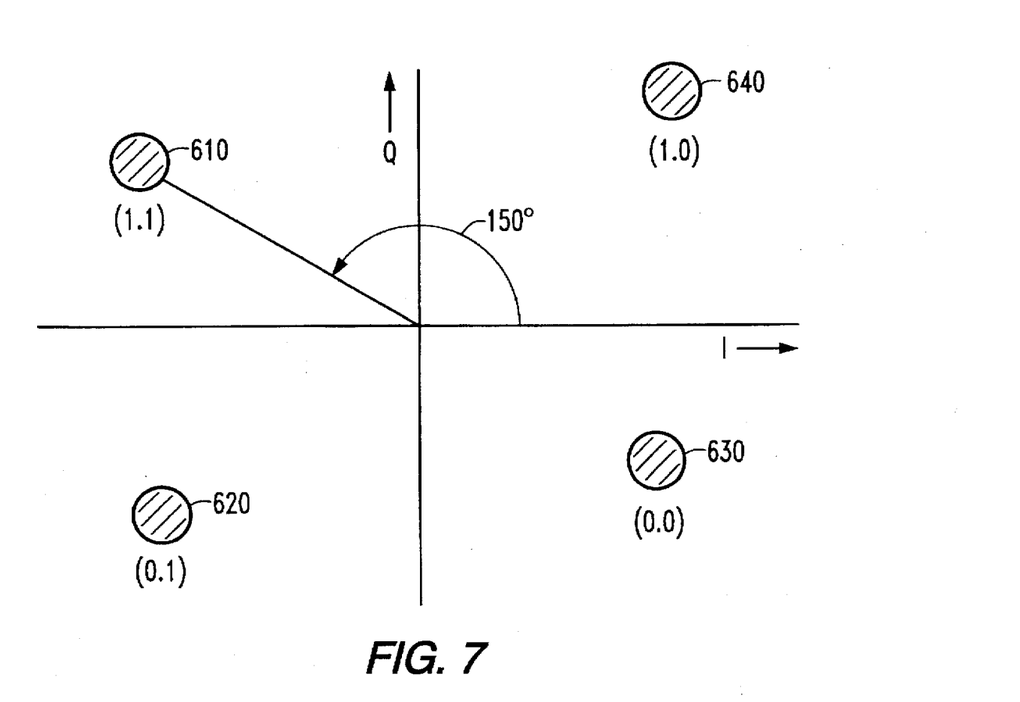
FIG. 7 is a diagram of examples of typical inputs into the QPSK detector of FIGS. 3A and 3B.

FIG. 7 is a diagram of an example of typical inputs to QPSK detector 280. In FIG. 7, the constellation of points has been rotated 105° due to noise and arbitrary phase shifting.

Figure 8:
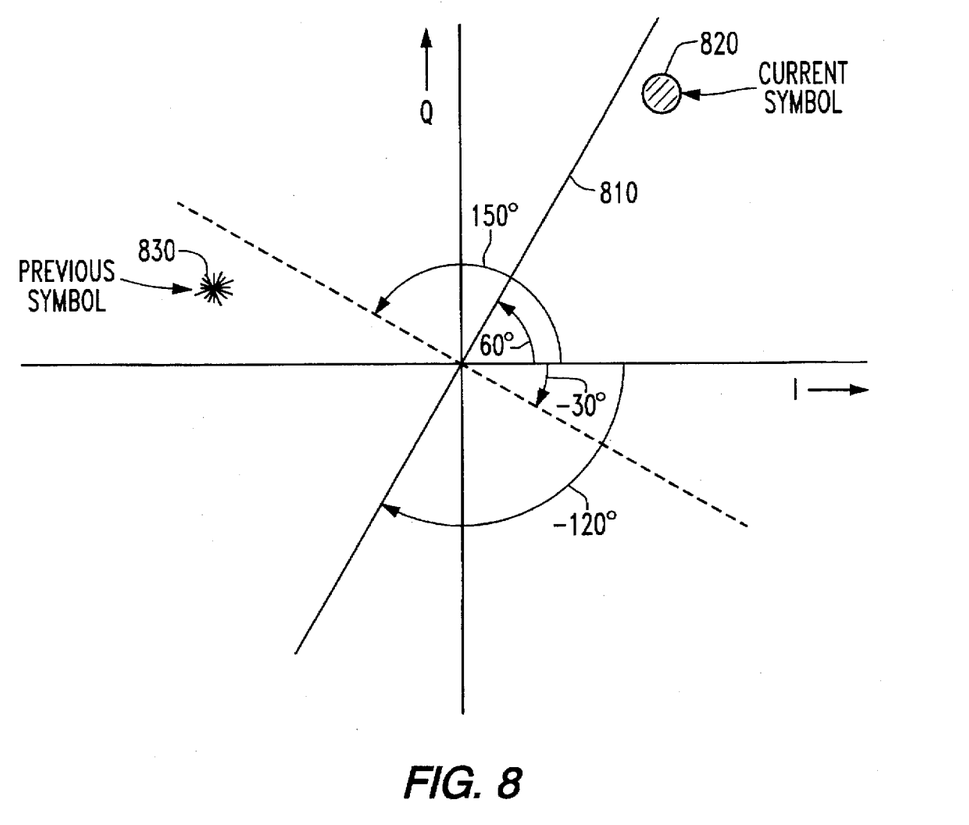
FIG. 8 is a diagram showing an ambiguous local phase reference.

FIG. 8 is a diagram showing an ambiguous local phase reference 810 output from arctangent element 312. (See FIG. 3.) The phase reference 810 is in the first quadrant. FIG. 8 shows a current symbol 820 and a previous symbol 830.

Figure 9:
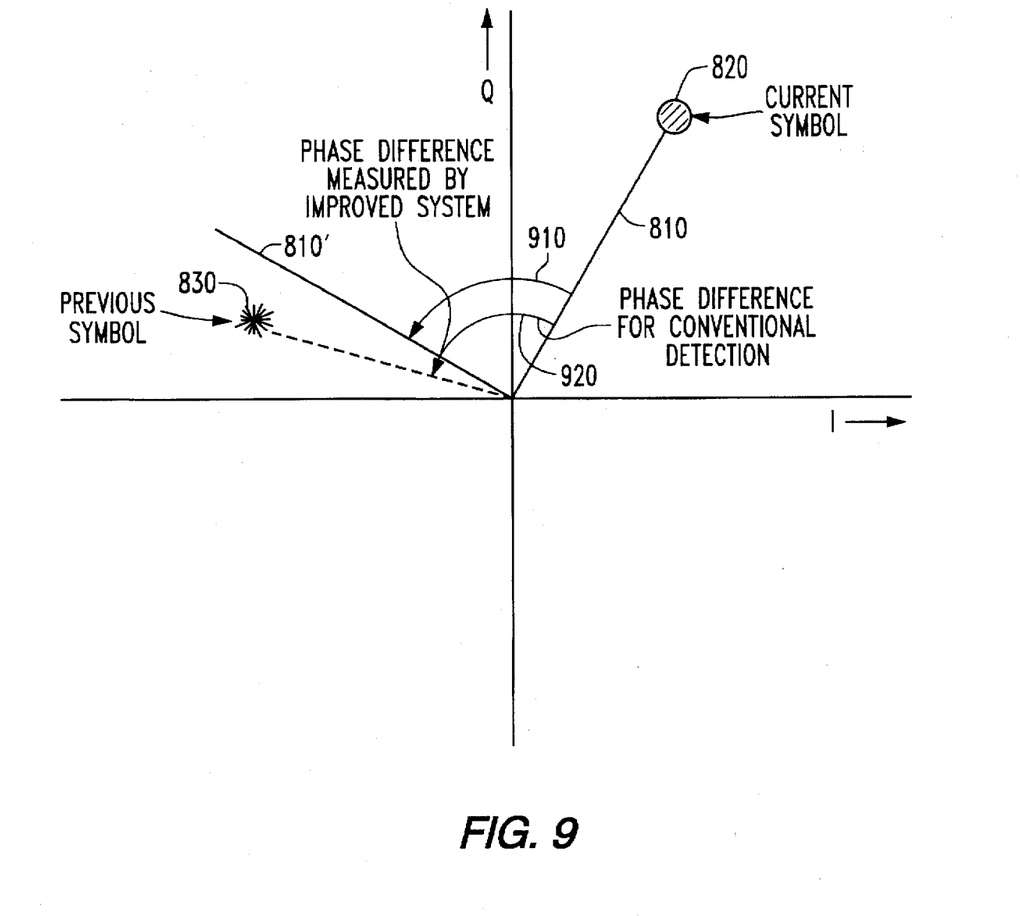
FIG. 9 is a diagram showing a phase difference for a conventional system and for the present invention.

FIG. 9 is a diagram showing a phase difference 910 between the current symbol 820 and shows a phase reference symbol 810' that has been resolved to the correct quadrant by complex multiplier 330. FIG. 9 also shows, by way of comparison, a phase difference 920 between the current symbol 820 and the previous symbol 830. Phase difference 920 is used by conventional systems that do not employ a locally coherent reference.

In the limit as the span of the fourth power phase averaging increases, the phase adjusted locally coherent detection becomes identical to coherent detection with differential coding. It is optimum, however, for an AWGN channel but not effective for a fading channel. Therefore, the span should be limited to optimize for the fading statistics.

In contrast, it can be shown that if the span of the weights is limited to a single symbol, specifically to the previous symbol from the symbol to be detected, then this result degrades to exactly differential detection. The reference phase then becomes $\theta_{n-1}$. Such a locally coherent detection scheme performs at least as well as differential detection assuming the filter weights are properly chosen.

10

$$\lim_{K \to \infty} \overline{s_n^4} = c \cdot e^{j4\phi} \quad (9)$$

$$\therefore$$

$$\frac{1}{4} \cdot \arctan\left(\frac{\Im(s_n^2)}{\Re(s_n^2)}\right) = \phi$$

Thus, the performance of the locally coherent QPSK detection is upper bounded by coherent detection (lower bound for BER) and lower bounded by differential detection (upper bound for BER) for an AWGN channel. Furthermore, it is intuitive that in a fading channel, the locally coherent QPSK detection can be optimized for better performance than either coherent or differential detection. In a preferred embodiment, optimization is achieved through selecting the proper filter weighting as a function of the fading statistics.

The present invention has been implemented for use in a Mobile Satellite Terminal (MT) modem. The performance of the locally coherent QPSK has been characterized and compared to coherent and differential QPSK detection techniques for the AWGN channel without fading, and compared with the differential QPSK detection for the fading cases where coherent detection will not function.

For this MT implementation of locally coherent QPSK detection, the weights for filtering the fourth power samples were derived from the autocorrelation of a 10% root cosine Nyquist fading filter with a 100 Hz bandwidth. A pair of these filters was used to generate the Rician fading with a multipath signal (Gaussian real and imaginary elements) at −10 dB relative to the direct path. A pair of filters was used to generate the Rician fading (Gaussian, Real and imaginary elements) with multipath component −10 db relative to the direct path.

Figure 11:
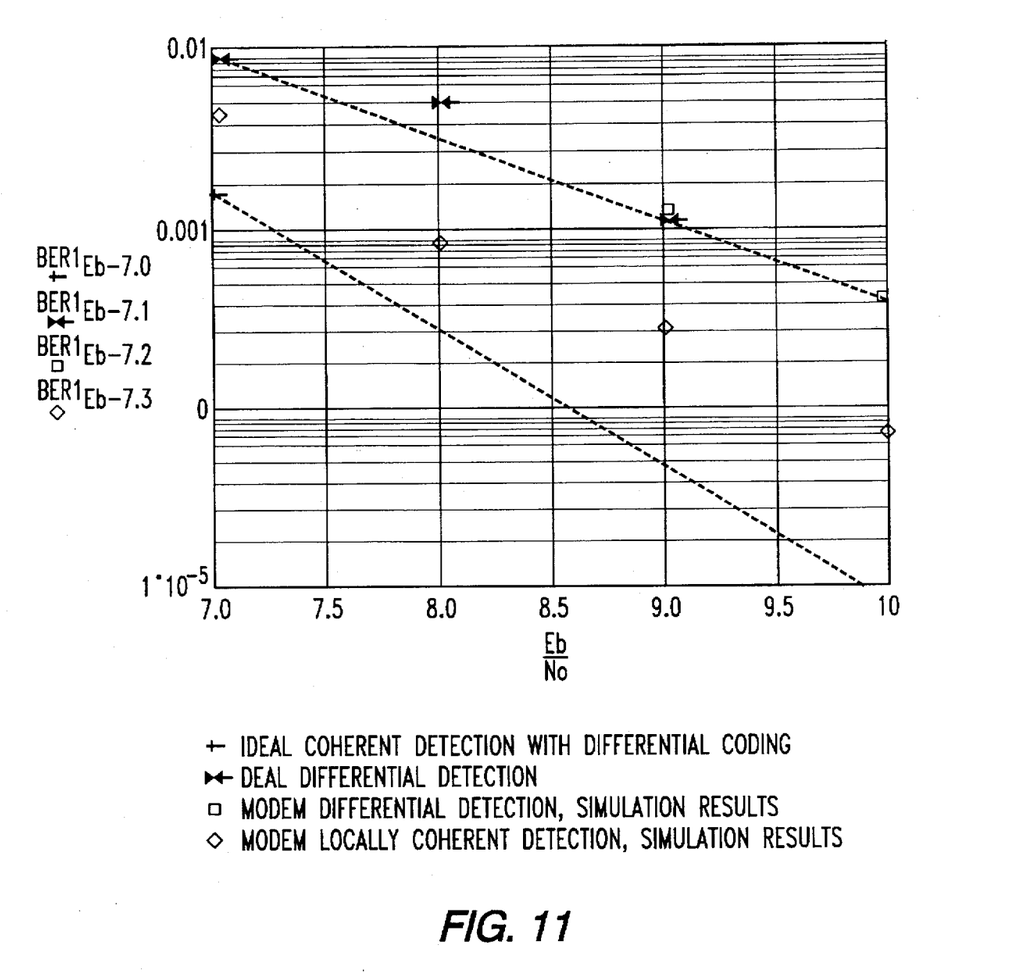
FIG. 11 is a graph comparing locally coherent QPSK detection in accordance with the present invention to a conventional technique in a non-fading environment.

FIG. 11 shows a computer simulation of the relative performance in an AWGN channel without fading. It is important to note that the locally coherent QPSK detection was not optimized for the no-fading AWGN channel. Carrier and symbol tracking algorithms were used in demodulating the signal for all but the theoretical coherent detection curve. The parameters of the tracking would accommodate fading rates up to several hundred Hz, and Doppler variations up to 400 Hz varying several tens of HZ per second, while the QPSK symbol rate was 3375 Hz. FIG. 10 clearly shows that the locally coherent QPSK technique outperforms conventional differential QPSK. The locally coherent QPSK performance is not as good as coherent QPSK detection in the non-fading channel since the locally coherent QPSK was optimized for 100 Hz fading (not the no-fading AWGN case here).

Figure 12:
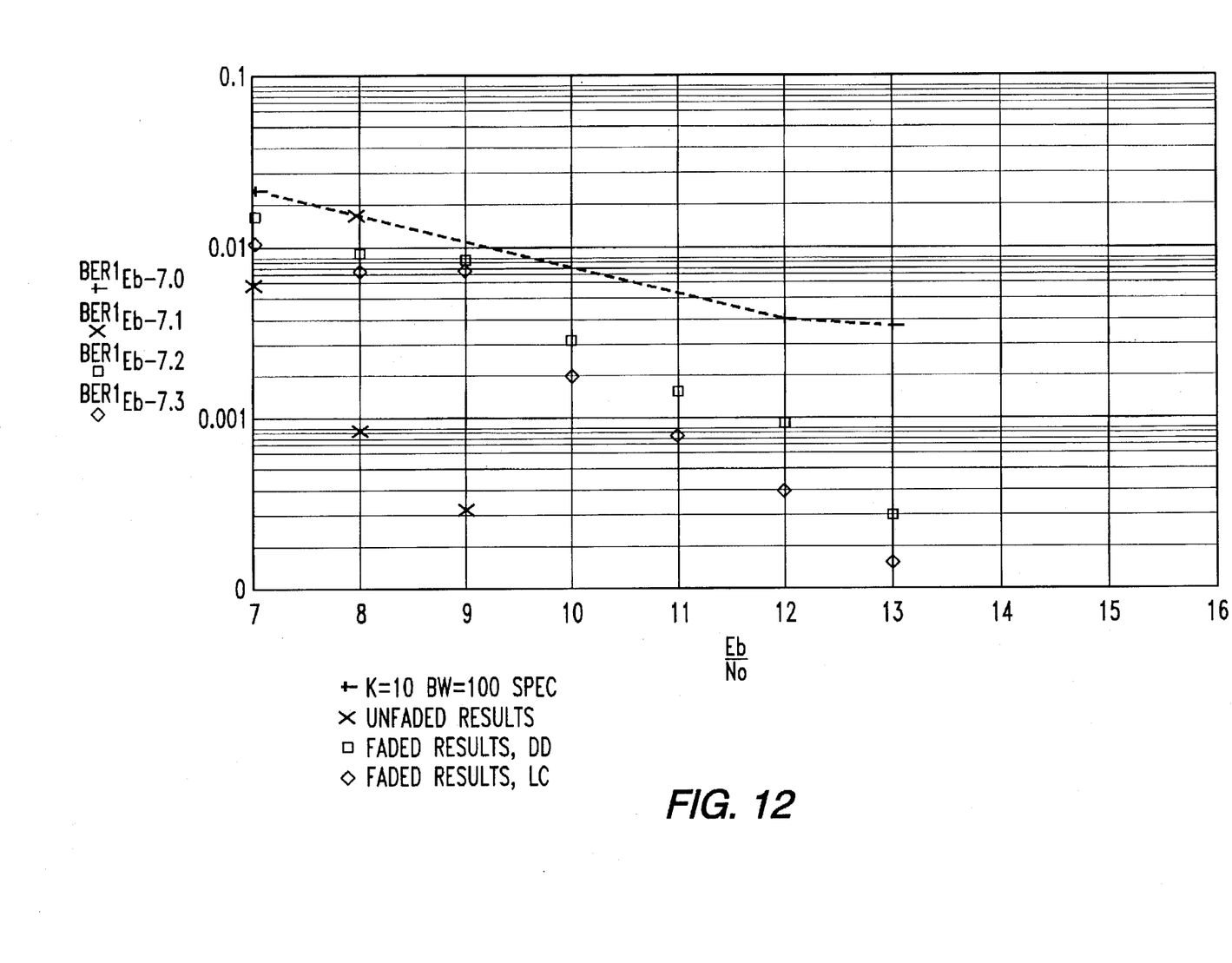
FIG. 12 is a graph comparing locally coherent QPSK detection of FIG. 10 in accordance with the present invention to a conventional technique in a fading environment.

FIG. 12 shows that, in a computer simulation of fading conditions, the locally coherent QPSK outperforms the differential QPSK. Coherent QPSK does not function under these fading conditions and cannot be compared. Therefore, FIG. 11 demonstrates the robustness of locally coherent QPSK under fading conditions, while coherent QPSK detection does not function, and differential QPSK is shown to be inferior. These results are typical for the cases simulated and the performance bounds were verified as expected.

The present invention produces a fourth power of an incoming symbol to remove modulations in the symbol. The output of the fourth power determination is weight averaged using a weighting function that is optimized for the fading environment in which the demodulator is expected to operate. The present invention produces an ambiguous phase reference for the current signal from the arctangent of a weighted average of the fourth powers of input symbols. The weighting function is optimized for the fading environment in which the demodulator is expected to operate. A phase-adjusted prior symbol is used to resolve the ambiguity in the ambiguous phase reference.

Other embodiments will be apparent to those skilled in the art from consideration of the specification and practice of the invention disclosed herein. It is intended that the specification and examples be considered as exemplary only, with a true scope of the invention being indicated by the following claims.

We claim:

1. A demodulator including an apparatus for detecting the information encoded by received symbols in a Quadrature Phase Shift Keyed (QPSK) signal, comprising:

means for receiving the QPSK signal, which is formed of successive symbols;

means for determining a fourth power of a sample of the received symbols, the sample of the received symbols including a previous symbol and a current symbol and a plurality of surrounding symbols;

means, connected to the fourth power determining means, for determining a weighted average of the output of the fourth power determining means;

means, connected to the weighted average determining means, for finding an ambiguous local phase reference for the current symbol;

means, connected to the ambiguous local phase reference finding means, for determining a phase adjustment of the previous symbol;

means, connected to the ambiguous local phase reference finding means, for resolving a phase of the ambiguous local phase reference in accordance with the determined phase adjustment of the previous symbol; and means, connected to the resolving means, for outputting a soft decision output for the current symbol in accordance with the resolved local phase reference.

2. The demodulator of claim 1, wherein each of the symbols received by the receiving means is treated as a current symbol in turn.

3. The demodulator of claim 1, further comprising a normalization means for normalizing the output of the fourth power determining means.

4. The demodulator of claim 1, wherein the weighted average determining means includes means for filtering the output of the fourth power determining means in accordance with predetermined fading parameters of a receiving system.

5. The demodulator of claim 1, wherein the weighted average determining means includes means for filtering the output of the fourth power determining means in accordance with an autocorrelation of a 10% root cosine Nyquist fading filter with a 100 Hz bandwidth.

6. The demodulator of claim 1, wherein the ambiguous local phase reference finding means includes:

means for computing a real angle value in accordance with an arctangent function.

7. The demodulator of claim 1, wherein the means for determining a phase adjustment of the previous symbol includes:

means for determining a complex conjugate of the ambiguous local phase reference, wherein the ambiguous local phase reference is in the first quadrant;

means for shifting the previous symbol by 45 degrees;

means for determining a product of the complex conjugate and the shifted previous symbol; and means for determining a quadrant of the ambiguous local phase reference in accordance with a quadrant indicated by the product.

8. The demodulator of claim 1, wherein the means for determining a phase adjustment of the previous symbol includes:

means for determining a conjugate product of the previous symbol and a value corresponding to the ambiguous local phase reference.

9. A demodulator including an apparatus for detecting the information encoded by received symbols in a Quadrature Phase Shift Keyed (QPSK) signal, comprising:

means for receiving the QPSK signal and outputting an ambiguous local phase reference for a current symbol, where the ambiguous local phase reference is based on a weighted average of k symbols, including the current symbol;

means, connected to the ambiguous local phase reference means, for resolving a phase of the ambiguous local phase reference in accordance with a phase of a previous symbol; and means, connected to the resolving means, for outputting a soft decision output of the current symbol in accordance with the resolved local phase reference.

10. In an RF receiver for a digital communication system, a method of detecting information encoded by received symbols in a Quadrature Phase Shift Keyed (QPSK) signal comprising:

receiving successive symbols of the QPSK signal;

sampling the received symbols including a previous symbol, a current symbol, and a plurality of surrounding symbols;

determining a fourth power of the sampled symbols;

determining a weighted average of the fourth power;

finding an ambiguous local phase reference for the current symbol;

adjusting the phase of the previous symbol;

resolving the phase of the ambiguous local phase reference in accordance with the phase adjustment of the previous symbol; and outputting a soft decision for the current symbol in accordance with the resolved local phase reference.

11. The method of claim 10 wherein the step of sampling includes treating each of the received symbols as a current symbol in turn.

12. The method of claim 10 further comprising normalizing the fourth power of the sampled symbols.

13. The method of claim 10 wherein the step of determining the weighted average comprises filtering the fourth power of the sampled symbols in accordance with fading parameters of the system.

14. The method of claim 10 wherein the step of determining the weighted average includes filtering the fourth power of the sampled symbols in accordance with an autocorrelation of a 10% root cosine Nyquist fading filter with a 100 Hz bandwidth.

15. The method of claim 10 wherein the step of finding the ambiguous local phase reference comprises computing a real angle value in accordance with an arctangent function.

16. The method of claim 10 wherein the step of adjusting the phase of the previous symbol comprises determining a complex conjugate of the ambiguous local phase reference to place the ambiguous local phase reference in a first quadrant; shifting the previous symbol by 45 degrees; determining a product of the complex conjugate and the shifted previous symbol; determining a quadrant of the ambiguous local phase reference in accordance with a quadrant indicated by the product.

17. The method of claim 10 wherein the step of phase adjusting the previous symbol includes determining a conjugate product of the previous symbol and a value corresponding to the ambiguous local phase reference.

18. In a demodulator, a method for detecting the information encoded by received symbols in a Quadrature Phase Shift Keyed (QPSK) signal, comprising receiving the QPSK signal;

outputting an ambiguous local phase reference for a current symbol where the ambiguous local phase reference is based on a weighted average of k symbols, including the current symbol;

resolving the phase of the ambiguous local phase reference in accordance with a phase of a previous symbol; and outputting a soft decision of the current symbol in accordance with the resolved local phase reference.

* * * * *